F. Flynn,
Rubber Boot.
No. 103,594.   Patented May 31, 1870.
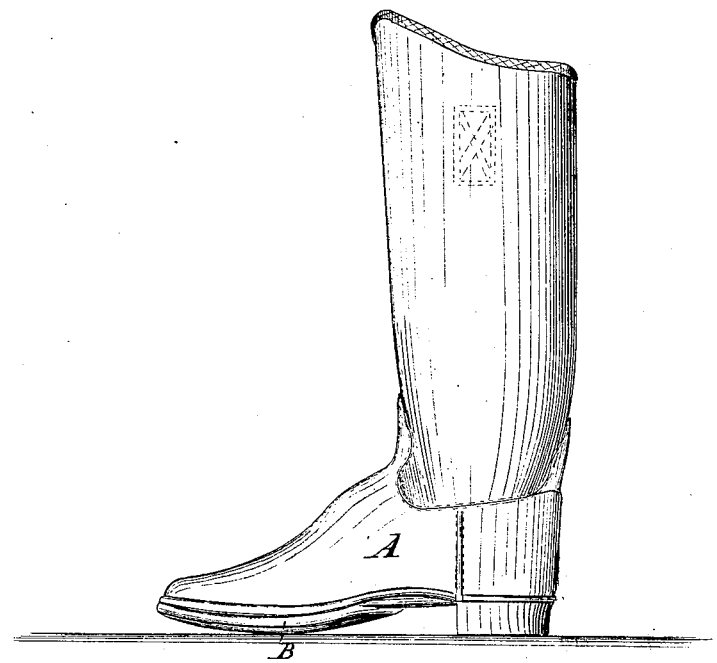

UNITED STATES PATENT OFFICE.

FRANCIS FLYNN, OF SMITHFIELD, ASSIGNOR TO THE WOONSOCKET RUBBER COMPANY, OF WOONSOCKET, RHODE ISLAND.

IMPROVED TAP FOR RUBBER BOOTS.

Specification forming part of Letters Patent No. 103,594, dated May 31, 1870.

*To all whom it may concern:*

Be it known that I, FRANCIS FLYNN, of Smithfield, in the county of Providence, and in the State of Rhode Island, have invented a new and useful Improvement in Rubber Soles of Boots and Shoes; and I do hereby declare that the following is a full, clear, and exact description thereof, reference being had to the annexed drawing, making part of this specification, in which—

Figure 1 represents a side elevation of a rubber boot with a tap of my construction. Fig. 2 is a bottom view of the same, showing the construction of the tap.

My invention relates to rubber boots and shoes; and my improvement consists in the construction of the double sole or tap, as will be more fully described hereinafter.

To enable those skilled in the art to make and use my invention, I will proceed to describe its construction and operation.

Rubber boots and shoes have heretofore been constructed with taps which terminated abruptly where the shank begins, which construction has been found to be very objectionable, because in walking the greatest strain comes directly across this point, so that after a few months' wear the tap would be started from the sole, making the boot useless.

It is my object to remove this objectionable feature, which I accomplish by extending the tap B under the shank of the boot A, and, instead of narrowing the tap abruptly at the points $b$ $b$, rounding and gradually narrowing it down to a point, $b'$, as clearly shown in Fig. 2 of the drawing.

The tap and main sole of the boot or shoe are united while in a plastic state, and then vulcanized together. By constructing the tap in this manner the strain brought upon it at the points $b$ will be partly taken up by the extension, and relieved to such an extent that it will be impossible to start off the tap; besides, it will make the boot just as serviceable as one with an entire double sole, though it can be made at a less cost.

I have described my invention as applicable only to rubber boots and shoes; but it is apparent that it is equally applicable to other boots and shoes in which a rubber tap-sole is used.

Having thus described my invention, what I claim, and desire to secure by Letters Patent, is—

A rubber tap-sole for rubber boots formed with a long and pointed shank extending under the shank of the boot or shoe, said tap-sole being fastened to the main sole by vulcanization, substantially as and for the purpose described.

The above specification signed by me this 13th day of December, 1869.

FRANCIS FLYNN.

Witnesses:
EDWIN ALDRICH,
J. BANIGAN.